United States Patent [19]

McConnell et al.

[11] 3,862,266

[45] Jan. 21, 1975

[54] POLYPROPYLENE/ACRYLIC ACID GRAFT COPOLYMERS

[75] Inventors: Richard L. McConnell; Robert B. Taylor; Peter M. Grant, all of Kingsport, Tenn.

[73] Assignee: Eastman Kodak Company, Rochester, N.Y.

[22] Filed: Feb. 26, 1973

[21] Appl. No.: 336,155

Related U.S. Application Data

[63] Continuation-in-part of Ser. No. 258,794, June 1, 1972, abandoned.

[52] U.S. Cl. ....... 260/878 R, 117/161 UZ, 161/247
[51] Int. Cl. ............................................. C08F 15/00
[58] Field of Search ................ 260/878 R; 161/247; 117/161 UZ

[56] References Cited
UNITED STATES PATENTS

| | | | |
|---|---|---|---|
| 3,299,176 | 1/1967 | Longworth | 260/878 R |
| 3,493,480 | 2/1970 | Kuroda et al. | 260/878 R |
| 3,499,819 | 3/1970 | Lewis | 161/247 |
| 3,575,948 | 4/1971 | Blunt | 260/878 R |

FOREIGN PATENTS OR APPLICATIONS 1,025,474   4/1966   Bulgaria................................ 260/878

Primary Examiner—Joseph L. Schofer
Assistant Examiner—A. Holler

[57] ABSTRACT

A graft copolymer of normally solid polypropylene and from about 0.2 to about 1.5 percent (0.4 to 0.8 percent being preferred) by weight based on the polypropylene of unsaturated acid component (monomer), said copolymer having a melt flow of from about 15 to about 175 g./10 minutes at 230°C. (55 to 95 being preferred), and being processable into a powder which can be applied to substrates and fused to form smooth coatings thereon.

16 Claims, No Drawings

POLYPROPYLENE/ACRYLIC ACID GRAFT COPOLYMERS

This is a continuation-in-part application of U.S. Ser. No. 258,794, filed June 1, 1972, now abandoned.

This invention concerns novel compositions and powders thereof having important utility for coating substrates including metals, by such means as electrostatic spraying, fluidized bed, and the like. The invention more particularly concerns novel, high melt flow, graft copolymers, and powders thereof, of polypropylene and principally acrylic acid, wherein the combined or grafted acrylic content is from about 0.2 up to about 1.5 percent by weight of the polypropylene.

Surface coating powders presently in commercial use generally comprise compositions based on poly(vinyl chloride), polyamides, plasticized cellulose acetate butyrate, certain polyesters which may contain flow aids such as modifying polymeric materials, and cross-linkable epoxy resins. Though useful, these materials have one or more drawbacks such as softness of the final coating, requirement of primer, need for volatile plasticizer causing fumes during curing, need for high curing temperatures, and need for flow aids. Moreover, none of these materials have the full range of desirable characteristics possessed by the present material, including cost economy, appearance, toughness, good impact strength, flexibility, adhesion, flow-out, relatively low fusion temperatures, pigmentability, and ease of preparation.

Objects, therefore, of the present invention are to provide superior compositions and powders thereof for coating substrates, and to provide articles coated therewith.

These and other objects hereinafter appearing have been achieved in accordance with the present invention through the discovery that very small amounts of acrylic acid, with or without minor amounts of other unsaturated acid materials, when grafted onto normally solid polypropylene in a manner to produce high melt flow rate (hereinafter M.F.) materials, give products which can be powdered and coated onto articles to provide a surface coating having markedly superior coating properties.

The composition of the present invention may be characterized as a graft copolymer of normally solid polypropylene and from about 0.2 to about 1.5 percent (0.4 to 0.8 percent being preferred) by weight based on the polypropylene of an unsaturated acid component, at least 75 mole percent of which is acrylic acid, said copolymer having a melt flow of from about 15 to about 175 g./10 minutes at 230°C. (55 to 95 being preferred), and being processable into a powder which can be applied to substrates and fused to form smooth, tough coatings. The unsaturated acid materials which may be used in conjunction with acrylic acid include methacrylic, fumaric acid and the acids and anhydrides of maleic, citraconic, itaconic, and aconitic.

Acrylic acid is readily grafted to crystalline polypropylene, for example, by melt-phase reaction in a compounding extruder or Banbury mixer using a peroxide initiator. When cryogenically ground to less than about 20 mesh size powder, these materials can be conveniently fluidized, bedcoated, and when ground to less than about 100 mesh size powder, can be electrostatically spray coated onto substrates such as metal panels including unprimed steel or aluminum, copper, brass and other chargeable substrates, and fused at about 350°F. to provide smooth coatings which have such properties as good appearance, adhesion, flexibility, toughness, impact strength and the like. The coating may also be quenched to further improve its gloss.

In preparing the graft copolymers, the polypropylene which can be in pellet or powder form may be coated with the desired amount of unsaturated acid component containing generally about 0.02–0.2 percent by weight, based on polymer weight of dissolved free-radical initiator. Alternatively, the polypropylene and the acid component containing the peroxide can be fed to the extruder in separate streams. The useful polypropylene for the reaction is crystalline and has a conditioned density as determined by ASTM D-1505 of at least about 0.90 up to about 0.93 and a melt flow rate (M.F.) as determined by ASTM D-1238 of from about 0.5 to about 60.0. Representative technology for preparing such polypropylene is found, for example, in the disclosures of U.S. Pat. Nos. 3,549,608; 3,412,078; and 3,112,300. The preferred range of initiator is about 0.04–0.10 percent by weight, based on polymer weight. Typical free-radical initiators useful in this process include 2,5-dimethyl-2,5-di(t-butylperoxy)hexane, di-t-butyl peroxide, t-butyl peracetate, and t-butyl perbenzoate. In general, it is beneficial to use a peroxide initiator which has a half life of about 2 to 60 sec. at 200°C. Reaction temperatures of about 175° to 260°C. are operable but the 190°–240°C. range is preferred. Suitable monomer concentrations include 0.3 to 2.0 percent by weight based on polymer weight; however, we prefer to use 0.75 to 1.25 percent monomer based on polymer weight.

Graft copolymers having a saponification number of about 3 (0.37 percent combined acrylic acid) to 12 (1.5 percent combined acrylic acid) and an M.F. of about 15 to 175 g./10 minutes at 230°C. are generally suitable to provide smooth fused powder coatings which have such properties as good appearance, flexibility, adhesion, toughness and impact strength. These compositions also provide good protective coatings for preventing rusting of steel members or structures.

Our preferred product has a saponification number of 4 to 8 and an M.F. of from 55 to about 95. In certain cases it appears to be desirable to start with a low M.F. polypropylene (e.g., M.F. 0.5–20) and degrade the polymer in molecular weight during the grafting step to the desired melt-flow. Where higher melt flow polypropylene is employed, e.g., up to about 60 or more, it is usually necessary to cut back on peroxide concentration and employ milder reaction conditions. The graft copolymer may be stabilized against thermal, oxidative and ultraviolet radiation degradation by addition of various polyolefin stabilizers such as: dilauryl thiodipropionate; 2,6-dioctadecyl-p-cresol; 4,4'-butylidene bis(6-t-butyl-m-cresol); 4-dodecyloxy-2-hydroxybenzophenone (DOBP); pentaerythritol tetrakis[3-(3,5-di-t-butyl-4-hydroxyphenyl)-propionate]; dioctadecyl 3,5-di-t-butyl-4-hydroxybenzyl phosphonate (Irganox 1093); 4,4'-methylene bis(2,6-di-t-butylphenol); 2-(3,5-di-t-amyl-2-hydroxyphenyl)benzotriazole; and combinations thereof.

It is frequently desirable to incorporate white or colored pigments or fillers such as $CaCO_3$ in the graft copolymer compositions, sometimes in high concentrations, and these may readily be added at the same time as the stabilizers. For example, stabilizers, fillers and pigments are preferably added to the graft copolymers in extruders or Banbury mixers. For the nonpigmented material, coating the pellets with stabilizers from a solution thereof is quite satisfactory. Typical useful pigments include titanium dioxide (Ti-Pure R100), calcium carbonate, talc, Zulu Blue 4849 (Harshaw Chemical Co.), Ultramarine Blue C.I. No. 1290 (Hartman-Leddon Co.), Monastral Red B-742D (Du Pont), Monastral Green 710D (Du Pont), carbon black and the like. It is frequently desirable to prepare masterbatches of graft copolymer containing high concentrations, such as 30 to 60 percent by weight based on total masterbatch composition of pigment, filler or the like and then mix the masterbatch with additional graft copolymer in a subsequent operation to provide desired pigment or filler levels, generally 2 to 30 percent by weight based on total, final composition. In order to provide soft or pastel colors, mixtures of $TiO_2$ and colored pigments may be employed.

EXAMPLE 1

GRAFTING 1.0 PERCENT ACRYLIC ACID TO POLYPROPYLENE

400 Grams of polypropylene (M.F. = 4.5 g./10 min. at 230°C., I.V. = 1.68 in Tetralin at 145°C., density = 0.912 g./cc.) as rod shaped pellets of approximately one-eighth in. diameter and approximately ⅛–174 in. length are coated by tumble blending with 4.0 g. of acrylic acid containing 200 ppm. of the methyl ether of hydroquinone (MEHQ) and 0.23 g. of 2,5-dimethyl-2,5-di(t-butylperoxy)hexane (Lupersol 101). The coated pellets (only slightly wet) are fed to a hopper fed Brabender ¾ in. single screw extruder operated at 200°C. with a reaction contact time of 140 sec. The graft copolymer is extruded from the end of the extruder in the shape of a rod approximately one-eighth in. diameter. The rod is cooled in a water bath which is adjacent to the extruder outlet and chopped into pellets of approximately ⅛ to ¼ in. length. These pellets are coated by tumbling with an acetone solution of 0.2% by weight 2,6 -dioctadecyl-p-cresol (DOPC) and 0.2 percent by weight dilauryl thiodipropionate (DLTDP) stabilizers based on total graft copolymer weight, and the acetone is then allowed to evaporate.

The stabilized pellets have a saponification number (Sap. No.) of 5.6 as determined as follows: Weigh approximately 4 g. of the stabilized graft copolymer sample into a 500 ml. alkali-resistant Erlenmeyer flask and dissolve the sample in 100 ml. distilled xylene. Reflux the solution 1 hour, cool to 75°C. or less, and add from a buret 30 ml. standardized 0.10 N KOH in ethyl alcohol. Reflux the solution for 45 min., cool, and add from a buret standardized 0.10 N $CH_3COOH$ in xylene until the mixture is acid to phenolphthalein. Add at least 1 ml. excess $CH_3COOH$. Reflux the solution for 15 min., remove from heat, add 5 ml. water, and titrate to a faint pink end point with 0.10 N KOH in ethyl alcohol. Run a blank (graft copolymer omitted) in this manner using the same amounts of reagents and the same heating times. The equation for the calculation is given below wherein N denotes the normality of the standard solution.

A 15.0 g. sample of the stabilized pellets is stripped at 200°C. and <1 mm. pressure for 3 hours. The stripping can be done conveniently in a test tube immersed in a heating bath and equipped with an outlet connected to vacuum. The stripped material has a Sap. No. of 4.5 (corresponds to 0.59 percent by weight of combined monomer based on copolymer weight), an M.F. of 33 g./10 min. at 230°C., and an I.V. of 0.94 in Tetralin at 145°C.

The stabilized pellets are cryogenically ground, using liquid nitrogen, in a Bantam Mikro-Pulverizer (hammermill) and then screened to obtain the powder which passes through 150 mesh. The powder which is larger than 150 mesh is mixed with unground pellets and recycled into the hammermill.

It is not economically desirable to grind the powder finer than about 325 mesh, however finer powders may be used. Mesh size is defined in Table 21–16 of Perry's *Chemical Engineers Handbook* — Perry, Chilton, Kirkpatrick, 4th Ed. McGraw-Hill Book Company, N.Y. (1963).

The <150 mesh powder is electrostatically sprayed, using a Gema AG Electrostatic Powder Spray Apparatus at a potential of 60 kv., onto unprimed bonderized (anticorrosion treated) steel test panels. The coated test panels are hung vertically in a 350°F. hot air circulating oven for 10 min. to allow the powder to fuse and flow out. Fusing temperatures between about 340° to about 450°F. are satisfactory, however, from about 350° to about 375°F. are preferred. For the higher fusion temperatures approximately 0.5 to 1.0 percent, based on copolymer weight, of any of the following is entirely adequate: Pentaerythritol tetrakis [3-(3,5-di-tert-butyl-4-hydroxy phenyl)propionate] [Irganox 1010]; 1,1,3-tris(3-tert-butyl-4-hydroxy-6-methyl) phenyl butane [Topanol CA]; and 1,3,5,-trimethyl-2,4,6-tris(3,5-di-tert-butyl-4-hydroxybenzyl) benzene [Ethyl 330].

The fused powder coating is transparent and very smooth. The fused powder coating when cut into tiny squares does not lift with Scotch tape (cross-hatched Scotch tape adhesion test), and passes the ⅛-in. conical mandrel bend flexibility test (ASTM D-522). The coating has a Gardner impact strength (in. lb.) of >80/60 (front/reverse), and a pencil hardness of HB as determined by the procedure on page 17 of National Coil Coaters Association Technical Bulletin No. II — 12 "Specification for Determination of Relative Pencil Hardness." Approximately the same results are obtained with cold rolled steel test panels.

EXAMPLE 2

GRAFTING 1.0 PERCENT ACRYLIC ACID TO POLYPROPYLENE

This example is similar to Example 1 except that the contact time in the Brabender extruder is decreased to 90 sec. by increasing the screw speed. After extrusion, the clear graft copolymer is chopped into pellets and stabilized as in Example 1.

The stabilized pellets have a Sap. No. of 5.4, and after stripping, as in Example 1, the polymer has a Sap. No. of 4.2 (corresponds to 0.55 percent by weight of combined monomer based on copolymer), M.F. of 21, $$\frac{\{(\text{ml. KOH} \times \text{N})-(\text{ml. } CH_3COOH \times \text{N})\}^{\text{For Sample}} - \{(\text{ml. KOH} \times \text{N})-(\text{ml. } CH_3COOH \times \text{N})\}^{\text{For Blank}}}{\text{Grams of Sample}} \times 56.1 = \text{Sap. No.}$$

and an I.V. of 1.09. This material has undergone extensive, but less molecular weight degradation than the material in Example 1 due to the shorter contact time used.

After grinding, screening, spraying and fusing, as in Example 1, the material forms a transparent coating on the unprimed bonderized steel. The fused coating has good appearance, adhesion, flexibility and toughness.

EXAMPLE 3

GRAFTING 1.0 PERCENT ACRYLIC ACID TO POLYPROPYLENE

This example is similar to Example 1 but uses 0.46 g. of 2,5-dimethyl-2,5-di(t-butyl peroxy) hexane in the extruder charge. After extrusion, the clear graft copolymer is chopped into pellets and stabilized as in Example 1.

The stabilized pellets have a Sap. No. of 5.5, and after stripping, as in Example 1, the material has a Sap. No. of 4.5 (corresponds to 0.59 percent by weight of combined monomer based on copolymer), M.F. of 66, and an I.V. of 0.87. This material has undergone greater molecular weight degradation than the previous polymers apparently due to the presence of more peroxide in the extruder charge.

After grinding, screening, spraying and fusing, as in Example 1, the material forms a clear and very smooth coating on unprimed bonderized steel with no trace of orange peel. The fused powder coating passes the cross-hatched Scotch tape adhesion test, and has a Gardner impact strength (in. lb.) of 70/20 (front-/reverse).

EXAMPLE 4

GRAFTING OF 2.0 PERCENT ACRYLIC ACID TO POLYPROPYLENE

This example is similar to Example 1 except that 8.0 g. of acrylic acid (2.0 percent based on polypropylene) is used instead of 4.0 g. (1.0% based on polypropylene). After extrusion, the clear graft copolymer is chopped into pellets and stabilized as in Example 1.

The stabilized pellets have a Sap. No. of 13.3, and after stripping, as in Example 1, the polymer has a Sap. No. of 11.9 (corresponds to 1.5 percent by weight of combined monomer based on copolymer), M.F. of 31, and an I.V. of 0.93. It is seen that doubling the amount of acrylic acid in the extruder charge more than doubles the amount of combined monomer, but the decrease in molecular weight is similar to that obtained in Example 1.

After grinding, screening, spraying and fusing as in Example 1, the material forms a transparent coating on unprimed bonderized steel. The coating has a good appearance with only a slight trace of orange peel. The fused powder coating passes the cross-hatched Scotch tape adhesion test, passes the ⅛-in. conical mandrel bend flexibility test, and has a Gardner impact strength (in. lb.) of 80/20 (front/reverse).

EXAMPLE 5

GRAFTING 5.0 PERCENT ACRYLIC ACID TO POLYPROPYLENE

Polypropylene (300 g.) is coated with 15 g. acrylic acid (5.0 percent by weight based on polypropylene) containing 0.3 g. of benzoyl peroxide (0.1 percent by weight based on the polypropylene) and then extruded at 200°C. with a contact time of 140 sec. using the Brabender extruder. After extrusion, the clear graft copolymer is chopped into pellets and stabilized with 0.2 percent DOPC and 0.2 percent DLTDP by coating the pellets with an acetone solution of the stabilizers and then allowing the acetone to evaporate. After stripping, as in Example 1, the material has a Sap. No. of 25.4 (corresponds to 3.3 percent combined monomer based on graft copolymer) and an M.F. of 2.3.

The polymer is ground, screened, and sprayed on unprimed bonderized steel as in Example 1. A fusion temperature of 375°F. for 10 min. is required to obtain optimum flow-out of this material. The fused powder coating surface of this polymer has considerable cratering and orange peel. The coating passes the cross-hatched Scotch tape adhesion test, passes the ⅛-in. conical mandrel bend flexibility test, but has a Gardner impact strength (in. lb.) of only 30/<10 (front-/reverse). Therefore, due to very low impact strength, heavy cratering and orange peel, this polymer with 3.3 percent combined acrylic acid is a much poorer powder coating material than the polymers shown in Examples 1–4. Similarly poor results are obtained when 5 percent acrylic acid is grafted to polypropylene using 2,5-dimethyl-2,5-di(t-butylperoxy) hexane instead of benzoyl peroxide.

EXAMPLE 6

WHITE PIGMENTATION OF POLY(PROPYLENE-G-ACRYLIC ACID)

Acrylic acid (1.0 percent in the feed based on polypropylene) is grafted to polypropylene as in Example 1, to obtain clear polymer with a Sap. No. of 6.2. After stripping, as in Example 1, the polymer has a Sap. No. of 5.1 (corresponds to 0.66 percent combined monomer based on graft copolymer), an M.F. = 29, and an I.V. of 0.94.

This poly(propylene-g-acrylic acid) (525 g.) in pellet form is dry blended wiht 225 g. of $TiO_2$ (Ti-Pure R-100), 1.26 g. of Ultramarine Blue (Hartman-Leddon Co. C.I. No. 1290), 9.0 g. of DOPC, and 9.0 g. of DLTDP. The dry blend gives a 30% $TiO_2$ masterbatch ($TiO_2$ based on total blend weight) when thoroughly mixed in a Banbury mixer and is chopped into pellets. Poly(propylene-g-acrylic acid) (3975 g., the same material as used to prepare the masterbatch) is then dry blended with approximately 770 g. of the 30% $TiO_2$ masterbatch, extruded at 200°C. and 32 rpm. in a 1.5 in. extruder manufactured by Modern Plastics Machinery, Inc., and chopped into pellets. The white, homogeneous, approximately ⅛ inch × ⅛ inch polymer pellets contain 5.0% $TiO_2$, 0.2% DOPC, and 0.2% DLTDP by weight based on polymer weight.

After grinding, screening, spraying and fusing, as in Example 1, the material forms a smooth white coating on unprimed bonderized steel. The fused powder coating properties of this white polymer are quite similar to those of the unpigmented polymer in Example 1.

Table 1 below shows the effect of melt flow rate on graft copolymer coating properties. In the preparation of these graft copolymers in a "Prodex" 1 ¾ inch, two-stage extruder, the higher melt flows are obtained by increasing the peroxide content and/or contact time in the extruder and/or, to some extent, the reaction temperature. Table 2 gives preparation conditions for these copolymers wherein the principal factor in achieving the desired melt flow was the peroxide content.

TABLE 1

[Fused Powder Coating Properties of PP/AA Formulations: Effect of PP/AA Melt Flow Rate]

All Samples contained 15% by weight of TiO$_2$ and 0.75% by weight of Irganox 1010 based on polymer weight. The graft copolymer preparations all employed 1% by weight of acrylic acid (AA). All powders passed through 150 mesh and were electrostatically sprayed onto bonderized steel —Parker "Bonderite 37".

| Sample | Fusion temp. (°F.) for 10 min. | Thickness (mil.) | Appearance rating[c] Orange peel | Crater | Adhesion tape test | Impact strength (lbs) Front | Reverse | Flexibility, ⅛" conical mandrel | Gardner gloss 20° | 60° | Pencil hardness | ASTM D2091-62T print resistance (°C.) | Taber abrasion resistance[d] (mg./1,000 cycles) |
|---|---|---|---|---|---|---|---|---|---|---|---|---|---|
| Example 6a: Sap. No.=4.8, M.F.=34.[f] | 350 | 3.3 | 5 | 6 | Pass | >160 | 140 | Pass | 1 | 14 | F | >120 | 44.5 |
| | 375 | 3.2 | 6 | 8 | do | >160 | >160 | do | 1 | 12 | F | >120 | 44.5 |
| | 400 | 3.1 | 7 | 8 | do | >160 | >160 | do | 1 | 13 | F | | |
| | 425 | 3.0 | 8 | 8 | do | >160 | >160 | do | 2 | 14 | F | | |
| | 450 | 2.5 | 8 | 8 | do | >160 | >160 | do | 2 | 15 | HB | | |
| Example 6b: Sap. No.=6.7, M.F.=50.[f] | 350 | 2.8 | 6 | 8 | do | >160 | >160 | do | 2 | 13 | B | >120 | 48.7 |
| | 375 | 3.0 | 7 | 8 | do | >160 | >160 | do | 2 | 13 | B | | |
| | 400 | 2.9 | 8 | 8 | do | >160 | >160 | do | 2 | 15 | | | |
| | 425 | 3.0 | 8 | 8 | do | >160 | >160 | do | 2 | 15 | HB | | |
| | 450 | 2.9 | 8 | 8 | do | >160 | >160 | do | 2 | 16 | | | |
| | e475 | 2.5 | 8 Slight yellowing | 8 | do | 120 | 60 | Fail | 2 | 16 | HB | | |
| Example 6c: Sap. No.=3.3, M.F.=70.[f] | 350 | 2.2 | 7 | 8 | do | >160 | >160 | do | 2 | 15 | | >120 | 47.8 |
| | 375 | 2.0 | 8 | 8 | do | >160 | >160 | do | 2 | 14 | HB | | |
| | 400 | 2.3 | 8 | 8 | do | >160 | >160 | do | 2 | 15 | | | |
| | 425 | 2.5 | 8 | 8 | do | >160 | >160 | do | 2 | 15 | B | | |
| | 450 | 2.3 | 8 | 8 | do | >160 | >160 | do | 2 | 15 | | | |
| | e475 | 1.7 | 8 Slight yellowing | 8 | Fail | >160 | >160 | Fail | 2 | 16 | HB | | |
| Example 6d: Sap. No.=4.6, M.F.=78.[f] | 350 | 2.9 | 7 | 8 | Pass | >160 | >160 | Pass | 2 | 15 | | >120 | 46.4 |
| | 375 | 2.7 | 8 | 8 | do | >160 | >160 | do | 2 | 14 | HB | | |
| | 400 | 2.9 | 8 | 8 | do | >160 | >160 | do | 2 | 15 | | | |
| | 425 | 2.9 | 8 | 8 | do | >160 | >160 | do | 2 | 15 | B | | |
| | 450 | 2.7 | 8 | 8 | do | >160 | >160 | do | 2 | 16 | | | |
| | e475 | 2.3 | 8 Slight yellowing | 8 | Fail | >160 | >120 | Fail | 2 | 16 | HB | | |
| Example 6e: Sap. No.=3.6, M.F.=94.[f] | 350 | 1.8 | 7 | 8 | Pass | >160 | >160 | do | 2 | 14 | | >120 | 47.4 |
| | 375 | 2.2 | 8 | 8 | do | >160 | >160 | do | 2 | 15 | B | | |
| | 400 | 2.1 | 8 | 8 | do | >160 | >160 | do | 2 | 15 | | | |
| | 425 | 2.3 | 8 | 8 | do | >160 | >160 | do | 2 | 16 | HB | | |
| | 450 | 2.7 | 8 | 8 | do | >160 | 140 | Fail | 2 | 16 | HB | | |
| | e475 | Coating degraded | | | | | | | | | | | |
| Example 6f: Sap. No.=4.0, M.F.=125.[f] | 350 | 1.9 | 8 | 8 | Pass | >160 | >160 | Pass | 2 | 14 | | >120 | 48.5 |
| | 375 | 1.8 | 8 | 8 | do | >160 | >1.0 | do | 2 | 15 | HB | >120 | 48.5 |
| | 400 | 2.5 | 8 | 8 | do | >160 | >160 | do | 2 | 16 | | | |
| | 425 | 2.6 | 8 | 8 | do | >160 | >160 | Fail | 2 | 16 | HB | | |
| | e450 | 2.5 | 8 | 8 | do | >160 | 120 | do | 2 | 15 | HB | | |
| | e475 | Coating degraded | | | | | | | | | | | |

[c] Appearance rating: 5=slight, 6=very slight, 7=trace, 8=none.
[d] CS-10 calibrase wheel with a 1 kg. load.
[e] Coating fused under these conditions was tacky to the touch.
[f] Small samples were stripped by heating at 200° C. and <1 mm. pressure for 1½ hours.

Table 2

| Example | Melt Flow Starting Polypropylene | Graft Copolymer | Acrylic Acid, wt. % | Lupersol 101, wt. % | Extrusion Temp., °C. | Residence (Reaction) Time, Sec. |
|---|---|---|---|---|---|---|
| 6a | 13 | 34 | 0.99 | 0.06 | 215 | 70 |
| 6b | 15 | 50 | 0.99 | 0.06 | 230 | 80 |
| 6c | 16 | 70 | 0.99 | 0.06 | 225 | 105 |
| 6d | 15 | 78 | 0.99 | 0.08 | 225 | 70 |
| 6e | 15 | 94 | 0.99 | 0.08 | 225 | 90 |
| 6f | 15 | 125 | 0.99 | 0.10 | 225 | 90 |

The above properties are determined as follows:

Fusion of the Coating — The test panels, electrostatically coated with powder, are hung on a bar in a Freas model 625A forced air oven and fused at a specified temperature for a specified time. The panels are then removed from the oven and allowed to cool to room termperature.

Gloss — 20 and 60° gloss are measured using a gloss meter (Gardner Laboratory Inc., Model GC-9095) (ASTM D-523).

Coating Thickness — The thickness of the coating is determined using a General Electric Thickness Gauge Type B.

Adhesion — Seven horizontal score lines about one-sixteenth in. apart are crossed with seven vertical score lines about one-sixteenth in. apart using a sharp razor blade to cut through the coating to the metal. Scotch tape is pressed down firmly over the cross-hatched pattern and pulled off rapidly. A failure is recorded when some or all of the coating is peeled off with the tape.

Impact Strength — Impact strength is determined using a Gardner Laboratory Inc. Impact Tester. A weight is dropped within a slide tube from a specified height to hit a punch having a ⅝-in. diameter hemispherical nose which is driven into the front (coated face) or back of the panel. The highest impact which does not crack the coating is recorded as inch-pounds front and reverse. Response to this impact test involves adhesive and flexibility properties as well as toughness.

Flexibility — The test panel is bent, over a period of 15 sec., using a Gardner Laboratory Inc. conical mandrel (ASTM D-522). A pass or fail is recorded.

Pencil Hardness — The pencil hardness of a coating is that of the hardest pencil which will not cut into the film. The procedure for preparing the truncated cone pencil lead and carrying out the test is given in the National Coil Coaters Association Technical Bulletin No. II – 12, Aug., 1968. Results are expressed covering the following scale:

(softest) 6B, 5B, 4B, 3B, 2B, B, HB, F, H, 2H, 3H, 4H, 5H, 6H (hardest).

Print Resistance — A weight is pressed on a piece of fabric which rests on the coating at a specified temperature. The "print" (indentation of the fabric on the test surface is recorded (ASTM D2091-62T). This identifies the softening temperature of the coating.

Abrasion Resistance — 4-in. by 4-in. test panels with a central hole to fit on the Taber Abrader are coated and fused. The number of milligrams abraded, during 1,000 cycles using clean CS-10 Calibrase wheels, is determined.

EXAMPLE 7

BLUE PIGMENTATION OF POLY(PROPYLENE-G-ACRYLIC ACID)

Using the same poly (propylene-g-acrylic acid) as in Example 1, a masterbatch dry blend is prepared by tumbling 525 g. of graft copolymer, 112.5 g. of $TiO_2$ (Ti-Pure R-100), 112.5 g. of Zulu Blue 4849 (Harshaw Chemical Co.), 9.0 g. of DOPC and 9.0 g. of DLTDP. The dry blend of the 15% $TiO_2$ and 15% Zulu Blue masterbatch (based on total masterbatch weight) is thoroughly mixed in a Banbury mixer and then chopped into pellets. Poly(propylene-g-acrylic acid) (3975 g., the same material as used to prepare the masterbatch) is then dry blended wtih 770 g. of 15% $TiO_2$ and 15% Zulu Blue masterbatch, extruded at 200°C. and 32 rpm. in the 1.5 in. extruder of Example 6, and chopped into pellets. The blue homogeneous pellets contain 2.5% $TiO_2$, 2.5% Zulu Blue, 0.2% DOPC, and 0.2% DLTDP by weight based on graft copolymer weight.

After grinding, screening, spraying and fusing as in Example 1, the material forms a smooth blue coating on unprimed bonderized steel. The fused powder coating properties of this blue material are essentially the same as those of the unpigmented polymer in Example 1.

EXAMPLE 8

COGRAFTING 1.0% BY WEIGHT OF ACRYLIC ACID AND 0.5 PERCENT BY WEIGHT OF MALEIC ANHYDRIDE TO EXAMPLE 1 POLYPROPYLENE

Acrylic acid (4.0 g.; 1% based on polymer weight) and maleic anhydride (2.0 g.; 0.5% based on polymer weight) are cografted to polypropylene (400 g.) according to the procedure described in Example 1 using 0.23 g. of Lupersol 101 and a contact time of 140 sec. After stripping the sample for 3 hr. at 200°C. (<mm. pressure) to remove volatile impurities, the clear, water white sample has a Sap. No. of 7,7, melt flow rate of 17.5 and an I.V. of 1.08. The sample is stabilized with 0.2% dilauryl thiodipropionate and 0.2% dioctadecyl-p-cresol. The sample is then cryogenically ground to <150 mesh size powder. When this powder is electrostatically sprayed on unprimed bonderized steel panels and fused in an oven at 350°F. for 10 min. (as described in Example 1), the panel has a smooth protective coating which has a good appearance. The coating has good adhesion, flexibility and toughness.

EXAMPLE 9

Unmodified polypropylene pellets having an M.F. of 4.5 and conditioned density of 0.912 are stabilized with 0.2% DLTDP and 0.2% DOPC and cryogenically ground according to the procedure described in Example 1. The powder obtained is then sieved and the portion which passes through a 150 mesh screen is electrostatically sprayed onto unprimed bonderized steel test panels. The coated panels are placed in a 350°F. hot air circulating oven for 10 minutes to allow the powder to fuse and flow out. The coated panels have a poor appearance (streaked surface) and the coatings have poor flexibility (polymer coating ruptures and peels away from the metal at the bend in the conical mandrel bend test), poor adhesion (polymer adheres to Scotch tape and pulls away from the metal in the cross-hatched Scotch tape test), and poor impact strength (Gardner impact strength of 30 and <10 in. lb. on front and reverse side of panel), respectively. Similarly poor results are obtained with <150 mesh powder from unmodified crystalline polypropylenes prepared as above and having melt flow rates of 15 and 30.

Although the invention has been described in considerable detail with particular reference to certain preferred embodiments thereof, it will be understood that variations and modifications can be effected within the spirit and scope of the invention.

We claim:

1. A graft copolymer comprised of normally solid polypropylene and from about 0.2 to about 1.5 percent by weight based on the polypropylene of reacted unsaturated acid component, at least 75 mole percent of which is acrylic acid, said graft copolymer having a melt flow rate of from about 15 about to about 175 g./10 minutes at 230°C., and being processable into a powder which can be applied to substrates and fused to form coatings.

2. The copolymer of claim 1 containing from about 0.4 to about 0.8 percent by weight of reacted acrylic acid, and having a melt flow rate of from about 55 to about 95 g./10 minutes at 230°C.

3. The graft copolymer of claim 1 wherein the polypropylene employed is crystalline with a conditioned density of at least about 0.90 and a melt flow of from about 0.5 to about 60.0 g./10 minutes at 230°C.

4. The graft copolymer of claim 1 in the form of a powder of less than about 20 mesh size.

5. The graft copolymer of claim 1 in the form of an electrostatically sprayable powder of less than about 100 mesh size.

6. The graft copolymer of claim 2 in the form of an electrostatically sprayable powder of less than about 100 mesh size.

7. The graft copolymer of claim 3 in the form of an electrostatically sprayable powder of less than about 100 mesh size.

8. The graft copolymer of claim 1 containing stabilizers, pigments, colorants, or fillers.

9. The graft copolymer of claim 2 containing stabilizers, pigments, colorants, or fillers.

10. The graft copolymer of claim 3 containing stabilizers, pigments, colorants, or fillers.

11. A substrate having coated thereon the graft copolymer of claim 1.

12. A substrate having coated thereon the graft copolymer of claim 2.

13. A substrate having coated thereon the graft copolymer of claim 3.

14. A substrate having coated thereon the graft copolymer of claim 8.

15. A substrate having coated thereon the graft copolymer of claim 9.

16. A substrate having coated thereon the graft copolymer of claim 10.

* * * * *